US010204225B2

(12) United States Patent
Chen et al.

(10) Patent No.: US 10,204,225 B2
(45) Date of Patent: Feb. 12, 2019

(54) SYSTEM AND METHOD FOR DETERMINING DESCRIPTION-TO-PERMISSION FIDELITY IN MOBILE APPLICATIONS

(71) Applicant: NORTHWESTERN UNIVERSITY, Evanston, IL (US)

(72) Inventors: Yan Chen, Northfield, IL (US); Zhengyang Qu, Evanston, IL (US); Vaibhav Rastogi, Evanston, IL (US)

(73) Assignee: Northwestern University, Evanston, IL (US)

( * ) Notice: Subject to any disclaimer, the term of this patent is extended or adjusted under 35 U.S.C. 154(b) by 111 days.

(21) Appl. No.: 14/711,157

(22) Filed: May 13, 2015

(65) Prior Publication Data
US 2015/0332049 A1  Nov. 19, 2015

Related U.S. Application Data

(60) Provisional application No. 61/993,398, filed on May 15, 2014.

(51) Int. Cl.
*G06F 21/57*  (2013.01)
*G06F 21/60*  (2013.01)

(52) U.S. Cl.
CPC .......... *G06F 21/57* (2013.01); *G06F 21/577* (2013.01); *G06F 21/604* (2013.01); *G06F 2221/033* (2013.01)

(58) Field of Classification Search
CPC ...... G06F 21/57; G06F 21/577; G06F 21/562; G06F 21/604; G06F 2221/033; G06Q 30/0282
See application file for complete search history.

(56) References Cited

U.S. PATENT DOCUMENTS

| 8,255,280 | B1* | 8/2012 | Kay ..................... G06F 21/53 705/26.1 |
| 8,532,978 | B1* | 9/2013 | Turner .................. G06F 17/271 704/10 |
| 9,407,443 | B2* | 8/2016 | Wyatt ..................... G06F 21/44 |
| 2009/0164926 | A1* | 6/2009 | Boyle ................ G06F 17/30867 715/764 |
| 2012/0124643 | A1* | 5/2012 | Moriconi ............. H04L 63/102 726/1 |
| 2012/0254143 | A1* | 10/2012 | Varma ................. G06F 17/2785 707/706 |
| 2012/0317638 | A1* | 12/2012 | Carrara .................. G06F 21/44 726/17 |
| 2013/0212684 | A1* | 8/2013 | Li ..................... G06F 17/30522 726/25 |

(Continued)

OTHER PUBLICATIONS

Costanich, Bryan. "Publishing to the App Store." Developing C# Apps for iPhone and iPad Using MonoTouch. Apress, 2011. 407-418.*

(Continued)

*Primary Examiner* — Michael Simitoski
(74) *Attorney, Agent, or Firm* — Benesch, Friedlander, Coplan & Aronoff LLP (57) ABSTRACT

A system and method are described to automatically assess description-to-permission fidelity of applications. The system and method can employ techniques in natural language processing and a learning-based algorithm to relate description with permissions.

8 Claims, 4 Drawing Sheets

(56) References Cited

U.S. PATENT DOCUMENTS

| | | | | |
|---|---|---|---|---|
| 2013/0333039 A1* | 12/2013 | Kelly | ............ | G06F 21/51 726/24 |
| 2014/0090061 A1* | 3/2014 | Avasarala | ............ | G06F 21/56 726/24 |
| 2014/0379521 A1* | 12/2014 | Novotny | ............ | G06Q 30/0201 705/26.7 |
| 2016/0012220 A1* | 1/2016 | Padidar | ............ | G06F 17/30598 726/22 |

OTHER PUBLICATIONS

Yang, Wei, et al. "Improving mobile application security via bridging user expectations and application behaviors." Proceedings of the 2014 Symposium and Bootcamp on the Science of Security. ACM, 2014.*

Jing, Yiming, et al. "Riskmon: Continuous and automated risk assessment of mobile applications." Proceedings of the 4th ACM Conference on Data and Application Security and Privacy. ACM, 2014.*

Zhong, Hao, et al. "Inferring resource specifications from natural language API documentation." Automated Software Engineering, 2009. ASE'09. 24th IEEE/ACM International Conference on. IEEE, 2009.*

Lin, Jialiu, et al. "Expectation and purpose: understanding users' mental models of mobile app privacy through crowdsourcing." Proceedings of the 2012 ACM Conference on Ubiquitous Computing. ACM, 2012.*

Peiravian, Naser, and Xingquan Zhu. "Machine learning for android malware detection using permission and api calls." Tools with Artificial Intelligence (ICTAI), 2013 IEEE 25th International Conference on. IEEE, 2013.*

Tan, Lin, et al. "/ iComment: Bugs or bad comments?." ACM SIGOPS Operating Systems Review. vol. 41. No. 6. ACM, 2007.*

Zhu, Jiawei, et al. "Permission-based abnormal application detection for android." International Conference on Information and Communications Security. Springer, Berlin, Heidelberg, 2012.*

Pandita, P.; Xiao, X; Yang, W.; Enck, W.; Xie, T. "Whyper: Towards automating risk assessment of mobile applications," 22nd USENIX Security Symposium, 2013, 17 pgs.

Au, K.W.Y.; Zhou, Y.F.; Huang, Z.; Lie, D. "Pscout: analyzing the android permission specification," In Proceedings of the 2012 ACM Conference on Computer and Communications Security, ACM, 2012, 12 pages.

Felt, A.P.; Chin, E.; Hanna, S.; Song, D.; Wagner, D. "Android permissions demystified," In Proceedings of the 18th ACM Conference on Computer and Communications Security, ACM, 2011, pp. 627-637.

Kennedy, K; Gustafson, E.; Chen, H. "Quantifying the effects of removing permissions from android applications," In IEEE Mobile Security Technologies (MoST), IEEE, 2013, 11 pgs.

Felt, A.P.; Greenwood, K; Wagner, D. "The effectiveness of application permissions," In Proceedings of the 2nd USENIX Conference on Web Application Development, Portland, OR, USA, USENIX Association, 2011, 16 pages.

* cited by examiner

Figure 1

Sample Sentence: "Search for a place near your location as well as on our interactive maps"
(ROOT
 (S
  (VP (VB Search -1)
   (PP
    (PP (IN for -2)
    (NP
     (NP (DT a -3) (NN place -4))
     (PP (IN near -5)
     (NP (PRP$ your – 6) (NN location – 7)))))
    (CONJP (RB as – 8) (RB well – 9) (IN as – 10))
    (PP (IN on -11)
    (NP (PRP$ our – 12) (JJ interactive – 13) (NNS maps -14))))))
det(place-4, a-3)
prep_for(Search-1, place-4)
poss(location-7, your-6)
prep_near(place-4, location-7)
poss(maps-14, our-12)
amod(maps-14, interactive-13)
prep_on(Search-1, maps-14)

SYSTEM AND METHOD FOR DETERMINING DESCRIPTION-TO-PERMISSION FIDELITY IN MOBILE APPLICATIONS

CROSS-REFERENCE TO RELATED APPLICATION

This application claims the benefit of U.S. Provisional application Ser. No. 61/993,398, filed on May 15, 2014, the disclosure of which is incorporated by reference herein in its entirety.

BACKGROUND

Android introduces a sophisticated permission-based security model, whereby an application declares a list of permissions, which are approved by the user at application installation. These permissions guard specific functionalities on the device, including some security and privacy-sensitive APIs such as access contacts, e.g., an address book.

Modern operating systems such as mobile, iOS, and Windows 8 have brought about the advent of big, centralized application stores that host third-party applications for users to view and install. Google Play, the official application store for mobile, hosts both free and paid applications together with a variety of metadata including the title and description, reviews, ratings, and so on. Additionally, it also provides the user with the ability to study the permissions requested by an application.

BRIEF DESCRIPTION OF THE DRAWINGS

In association with the following detailed description, reference is made to the accompanying drawings, where like numerals in different figures can refer to the same element.

DETAILED DESCRIPTION

The popularity of smartphones and tablets are a result of application markets, e.g., Google Play, where users can download wide range of third-party applications to suit their needs. Given the open nature of markets, e.g., mobile, there have also been several privacy and security concerns with these applications. On Google Play, as with most other markets, users have access to natural-language descriptions of applications, which give an intuitive idea of the functionality including the security-related information of those applications. Google Play also provides the permissions requested by applications to access sensitive application programming interfaces (APIs) on the devices. Users may use this list to evaluate the risks of using these applications. To best assist the users, the descriptions can reflect the need for permissions, which can be termed description-to-permission fidelity.

Modern operating systems such as mobile have promoted global ecosystems centered around large repositories or marketplaces of applications. Success of these platforms may in part be attributed to these marketplaces. Besides serving applications themselves, these market-places also host application metadata, such as descriptions, screenshots, ratings, reviews, and, in case of mobile, permissions requested by the application, to assist users in making an informed decision before installing and using the applications. From the security perspective, applications may access users' private information and perform security-sensitive operations on the devices. With the application developers having no obvious trust relationships with the user, these metadata may help the users evaluate the risks in running these applications.

Few users, however, may be discreet enough or have the professional knowledge to understand the security-implications that may be derived from metadata. For example, on Google Play, users are shown both the application descriptions and the permissions declared by applications. In mobile, security-sensitive system APIs are guarded by permissions, which applications have to declare and which have to be approved at install-time. An application's description describes the functionality of an application and should intuitively give an idea about the permissions that would be requested by that application. This is description-to-permission fidelity. For example, an application that describes itself as a social networking application can likely need permissions related to device's address book. A number of malware and privacy-invasive applications have been known to declare many more permissions than their purported functionality warrants.

With this belief that descriptions and permissions should generally correspond, a system and method described herein can automatically identify if the permissions declared by an application are consistent with its description. Such a system can have multi-fold uses.

Application developers can use this tool to receive an early, automatic feedback on the quality of descriptions so that they improve the descriptions to better reflect the security-related aspects of the applications.

End users may use this system to understand if an application is over-privileged and risky to use.

Application markets can deploy this tool to bolster their overall trustworthiness.

A challenge addressed is to gather enough semantics from application descriptions in natural language to reason about the permissions declared. Natural language processing (NLP) is applied for sentence structure analysis and computing semantic relatedness of natural language texts. A learning-based algorithm automatically derives a model that can be queried against with descriptions to get the expected permissions.

Relating descriptions and permissions. A learning-based algorithm models description-to-permission relatedness. An algorithm correlates textual semantic entities (second contribution) to the declared permissions. The model is trained from application descriptions and declared permissions over a large set of applications without depending on external data such as API documents, to avoid the problems of limited semantic information or lack of associated APIs. Furthermore, both training and classification are automatic.

Extracting semantics from descriptions. The systems and methods can utilize NLP techniques to automatically extract semantic information from descriptions. Explicit semantic analysis (ESA 108) leverages big corpuses like Wikipedia to create a large-scale semantics database and/or dictionary-based synonyms and other methods.

In one example, the systems and methods can automatically extract relevant semantics from mobile application descriptions and permissions to produce permission models by using a learn-based method. The models are used to measure description-to-permission fidelity: given an application description, a permission model outputs whether the permission is expected to be required in the perspective of human reader. If the answer is yes, the systems and methods can further provides relevant parts of description that warrant the permission. The permission without semantic warrant can be classified as questionable permission, which enables improvement of the quality of descriptions. By utilizing the system and method learning-based methods and a neuro-linguistic programming (NLP) techniques, the systems and methods can correlate with human readers in inferring mobile permission from natural language descriptions with vast diversity.

The system and method may be used by users or developers individually or deployed at application markets such as Google Play. It may automatically alert the end users if an application requests more permissions than required for the stated functionalities. The tool can provide useful feedback about the shortcomings of the descriptions to the developers and further help bolster the overall trustworthiness of the mobile ecosystem by being deployed at the markets.

With regard to automatically measuring description-to-permission fidelity, the systems and methods deal with: (a), the description semantics, which relates to the meaning of the description, and (b), the permission semantics, which relates to the functionality provided (or protected) by the permission. Challenges in solving the problem can lie in:

Inferring description semantics: Same meaning may be conveyed in a vast diversity of natural language text. For example, the noun phrases "contact list", "address book", and "friends" share similar semantic meaning.

Correlating description semantics with permission semantics: A number of functionalities described may map to the same permission. For example, the permission to access user location might be expressed with the texts "enable navigation", "display map", and "find restaurant nearby". The need for permission WRITE EXTERNAL STORAGE can be implied as "save photo" or "download ringtone".

In the system and method, consider the decision version of the above-stated problem: given a description and a permission, does the description warrant the declaration of the permission? If the system and method answers yes, it additionally provides the sentences that warrant the permission, thus assisting users in reasoning about the requested permission. As a complete system, the system and method solves this decision problem for each permission declared.

The system and method approach can automatically discovers a set of textual patterns correlated with permissions from the descriptions of a rich set of applications, hence enabling description-to-permission relatedness model to achieve a complete coverage over the natural language texts with great diversity. Besides, the training process works directly on descriptions. The system and method can overcome the limitations of the previous work as stated above.

Figure 1:
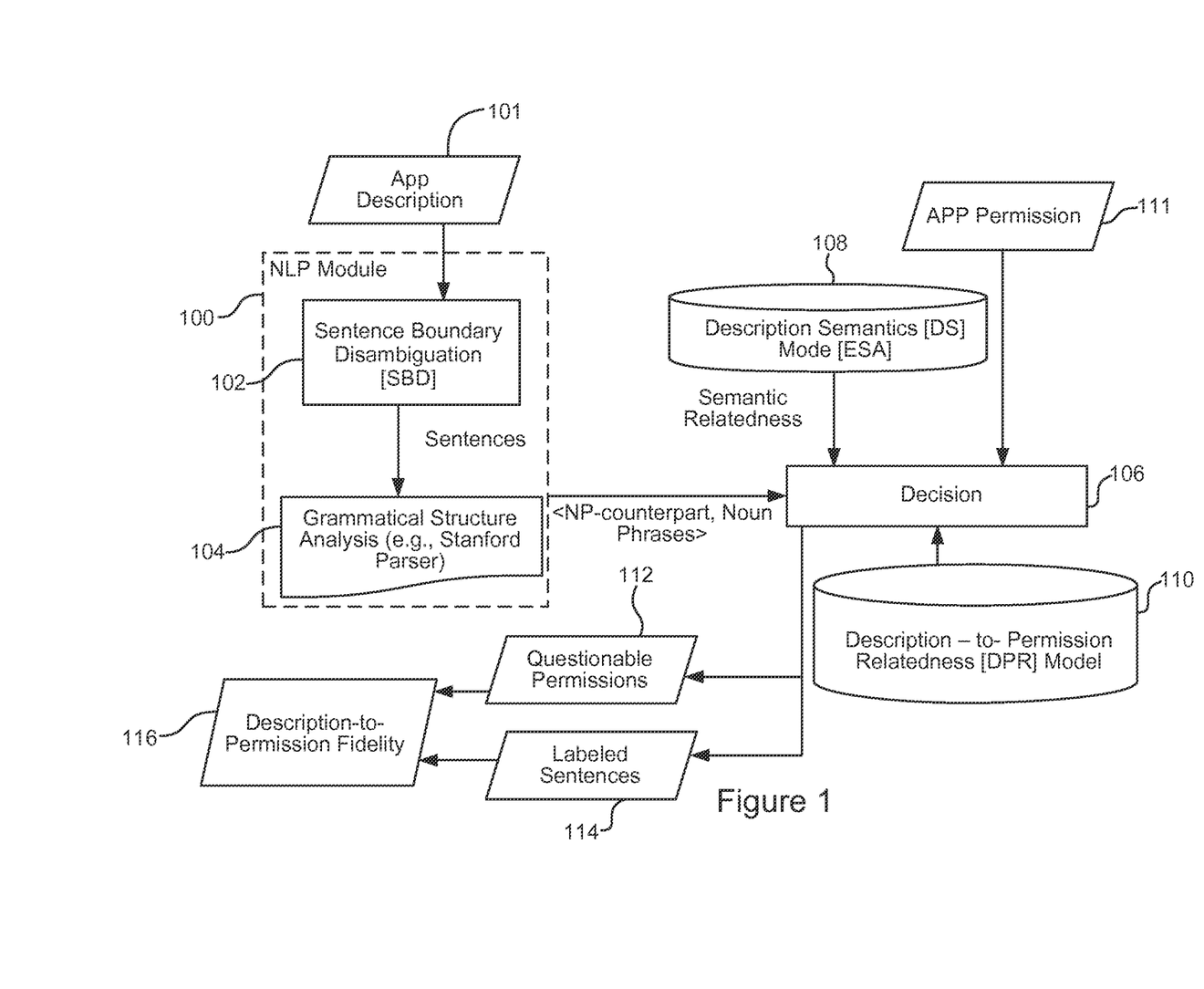
FIG. 1 is an exemplary architecture for the system and method.

FIG. 1 is an exemplary architecture for the system and method. The description of the application 101 is first processed by the NLP module 100, which disambiguates sentence boundaries with module 102 and subsequently analyzes each sentence for grammatical structure using a parser module, e.g. a Stanford Parser 104. The output of the NLP module 100 is then passed in together with the application permissions 111 into the decision module 106, e.g., computer processor, which, based on models of description semantics module (e.g., ESA 108) and description-to-permission relatedness 110 outputs the questionable permissions 112 that are not warranted from the description and the labeled sentences 114 from which the other permissions may be inferred. These outputs together provide description-to-permission fidelity 116. The following description provides an example design of each of the modules and the models that include the system and method. The systems and methods can be implemented with a computer implemented algorithm stored in memory and executed by a computer processor.

3.1 NLP Module 100

The NLP module 100 identifies specific constructs in the description such as noun and verb phrases and understand relationship among them. Use of such related constructs alleviates the shortcomings of simple keyword-based analysis. The NLP module 100 includes two components, sentence boundary disambiguation and grammatical structure analysis.

Sentence Boundary Disambiguation (SBD) 102

The whole description is split into sentences for subsequent sentence structure analysis. Characters such as ".", ":", "–", and some others like "*", "♠", "♦" that may start bullet points are treated as sentence separators. Regular expressions are used to annotate email addresses, URLs, IP addresses, Phone numbers, decimal numbers, abbreviations, and ellipses, which interfere with SBD as they contain the sentence separator characters.

3.1.2. Grammatical Structure Analysis

A parser, e.g., Stanford Parser 104 identifies the grammatical structure of sentences. Other NLP parsers could be used as well.

Figure 2:
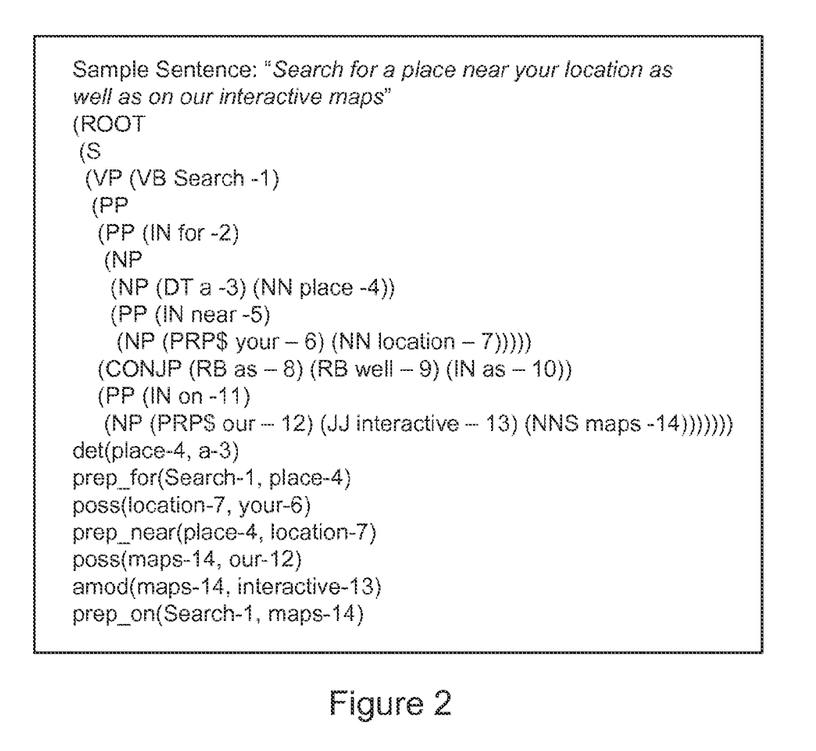
FIG. 2 is an exemplary output of a parser.

The Stanford Parser 104 to outputs typed dependencies, which are semantic hierarchies of sentences, e.g., how different parts of sentences depend on each other. As illustrated in FIG. 2, the dependencies are triplets: name of the relation, governor and dependent. Part of Speech (PoS) tagging additionally assigns a part-of-speech tag to each word; for example, a verb, a noun, or an adjective. The results of these are fed into phrase parsing provided by Stanford Parser 104 to break sentences into phrases, which could be noun phrases, verb phrases or other kinds of phrases. A hierarchy of marked phrases and tagged words are obtained for each sentence.

The governor-dependent pair provides the knowledge of logic relationship between various parts of sentence, which provides the guideline of the ontology modeling. The concept of ontology is a description of things that exist and how they relate to each other. The following ontologies, which are governor-dependent pairs based on noun phrase, can be used.

Logical dependency between verb phrase and noun phrase potentially implies the actions of applications performing on the system resources. For example, the pairs <"scan", "barcode"> and <"record", "voice"> reveal the use of permissions camera and recording.

Logical dependency between noun phrases is likely to show the functionalities mapped with permissions. For instance, the pairs <"scanner", "barcode"> and <"note", "voice"> can be recognized by users as telling the need of using camera and microphone.

Noun phrase with own relationship (word tagged as possessive, such as "your", followed by resource names) is probably recognized as telling permissions. For example, the CAMERA and RECORD AUDIO permissions could be revealed by the pairs <"your", "camera"> and <"own", "voice">.

The noun phrases in the leaf nodes of the hierarchical tree output are extracted from grammatical structure analysis. Then, for each noun phrase, record all the verb phrases and noun phrases that are its ancestors or siblings of its ancestors. Moreover, if the noun phrase itself contains the own relationship, also record the possessive. For the sake of simplicity, call the extracted verb phrases, noun phrases, and possessives as np-counterpart for the target noun phrase. The noun-phrase based governor-dependent pairs obtained thus signify direct or indirect dependency. The example hierarchy tree for sentence "Search for a place near your location as well as on interactive maps" is shown in FIG. 2 and the pairs extracted are: <"search", "place">, <"search", "location">, <"place", "location">, <"your", "location">, <"search", "interactive map">, and <"our", "interactive map">.

Further process these pairs to remove stopwords and named entities. Stopwords are common words that may provide much semantic information, e.g., "the", "and", "which", and so on. Named entities include names of persons, places, companies, and so on. These also do not communicate security-relevant information in the context. To filter out named entities, the system and method can employ named entity recognition using NLP, also implemented in Stanford Parser 104. The remaining words are normalized by lowercasing and lemmatization. Example normalizations include "better"→"good" and "computers"→"computer". The processed pairs are now ready for use in other modules.

3.2 Description Semantics (DS) Model 108

To understand the meaning of a natural language description, e.g., how different words and phrases in a vocabulary relate to each other, similarly meaning natural language descriptions can differ vastly; so an analysis is utilized. The system and method can be constructed using Explicit semantic analysis (ESA 108) for computing semantic relatedness of natural language texts. The model is used directly by the decision module and also for learning the description-to-permission relatedness model in Section 3.3.

ESA 108 is an algorithm to measure the semantic relatedness between two pieces of text. It leverages big document corpuses such as Wikipedia as its knowledge base and constructs a vector representation of text (individual words or entire documents). In ESA 108, each (Wiki) article is called a concept, and transformed into a weighted vector of words within the article. When processing an input article, ESA 108 computes the relatedness of the input to every concept, e.g. projects the input article into the concept space, by the common words between them. In NLP and information retrieval applications, ESA 108 is normally used to compute the relatedness of two input articles using the cosine distance between the two projected vectors.

Other algorithms for computing semantic relatedness can be used such as WordNet and latent semantic analysis. However, WordNet-based methods are currently inherently limited to individual words, and adoption for comparing longer text requires an extra level of sophistication. Second, considering words in context allows ESA 108 to perform word sense disambiguation. Using WordNet currently cannot achieve disambiguation, since information about synsets (sets of synonyms) is limited to a few words; while in ESA 108, concepts are associated with huge amounts of text. Finally, even for individual words, ESA 108 offers a much more detailed and quantitative representation of semantics. It maps the meaning of words/phrases to a weighted combination of concepts, while mapping a word in WordNet amounts to lookup, without any weight.

TABLE 1

Distribution of Noun Phrase Patterns:

| Pattern | #Noun Phrase (Percentage %) |
|---|---|
| Noun | 1,120,850 (52.37%) |
| Noun + Noun | 414,614 (19.37%) |
| Adjective + Noun | 278,785 (13.03%) |
| Total | 1,814,249 (84.77%) |

Pattern of noun phrase; Number/percentage of noun phrases in the pattern within 2,140,225 noun phrases extracted from 37,845 applications.

3.3 Description-to-Permission Relatedness (DPR) Model 110 110

Description-to-permission relatedness (DPR) model 110 is a factor in enhancing the accuracy of the system and method. A learning-based algorithm analyzes the descriptions and permissions of a large dataset of applications to measure how closely a noun-phrase based governor-dependent pair is related to a permission.

Figure 3:
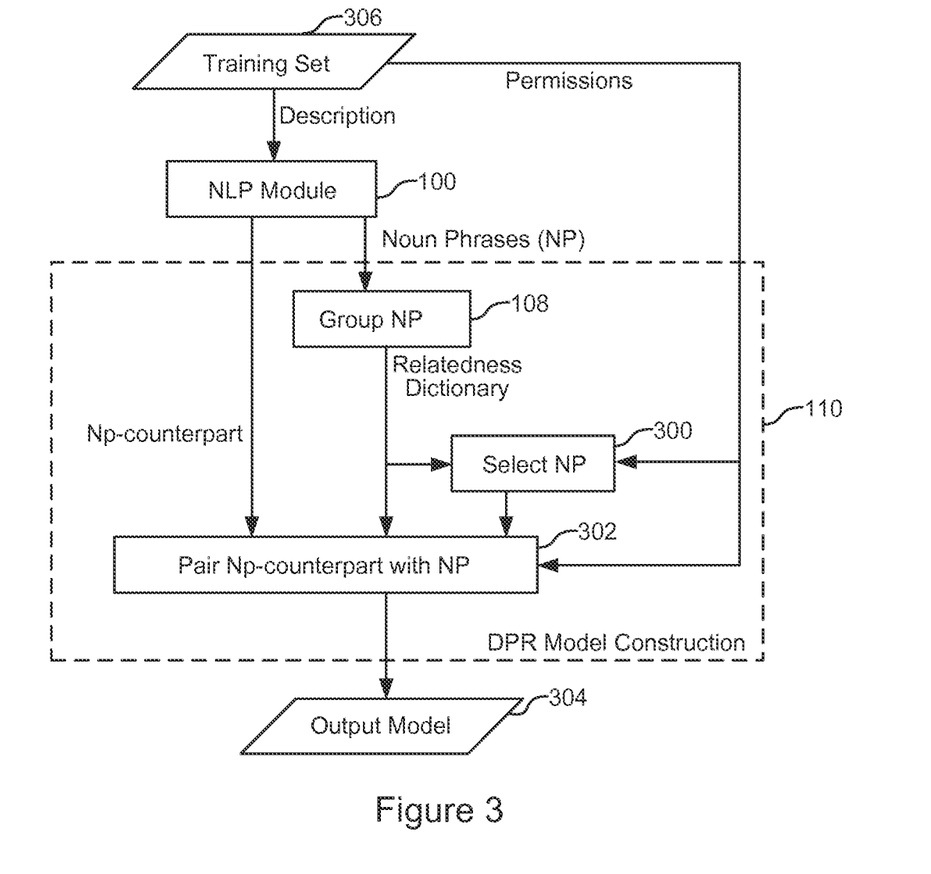
FIG. 3 is a flowchart of an exemplary description-to-permission relatedness construction.

An example flowchart for building the DPR model 110 is illustrated in FIG. 3. ESA 108 groups the noun phrases (NP) with similar semantics. For each permission, a select module 300 produces a list of noun phrases whose occurrence in descriptions is positively related to the declaration of that permission in the corresponding applications. Such phrases may potentially reveal the need for the given permission. In the third stage, the DPR model 110 can further enhance the results by adding in the np-counterparts 302 (of the noun-phrase based governor-dependent pairs) and keeping only the pairs whose occurrence statistically correlates with the declaration of the given permission. The DPR model 110 can send the result to an output module 304. The stages are described in detail in the following.

3.3.1 Grouping Noun Phrases (e.g., ESA 108)

A noun phrase contains a noun possibly together with adjectives, adverbs, etc. During the learning phase, since analyzing long phrases is not efficient, consider phrases of only three patterns: single noun, two nouns, and noun following adjective (Table 1). In the dataset of 37,845 applications, these patterns account for 85% of the 302,739 distinct noun phrases. Further note the focus on these restricted patterns only during DPR model construction; all noun phrases are considered in the decision module of the system and method, which checks whether the description of application indicates a given permission. The DS model, which is also employed during decision-making, can match longer patterns with similarly-meaning noun phrases grouped here. Hence the negative effect of such simplification is negligible.

Construct a semantic relatedness score matrix leveraging DS model with ESA 108. Each cell in the matrix depicts the semantic relatedness score between a pair of noun phrases. Determine the frequency of occurrence of noun phrase to be the number of applications whose descriptions contain the noun phrase. As constructing the semantic relatedness score matrix has quadratic runtime, it is not scalable and efficient. Filter out noun phrases with low frequencies from this matrix, as the small number of samples cannot provide enough confidence in the frequency-based measurement. If a low-frequency phrase is similar to a high-frequency phrase, the decision process is not affected as the decision module employs DS model. Choose a threshold, e.g., 15;

only phrases with frequency above 15 are used to construct the matrix. The number of such phrases in the dataset is 9,428 (3.11%).

Using the semantic relatedness score matrix, create a relatedness dictionary, which maps a given noun phrase to a list of noun phrases, all of which have a semantic relatedness score higher than the threshold θg. The interpretation is that the given noun phrase may be grouped with its list of noun phrases as far as semantics is concerned. The implementation takes θg to be 0.67. The lists also record the corresponding semantic relatedness scores for later use. A sample dictionary entry of the noun phrase "map" is as follows:
<"map", [("map", 1.00), ("map view", 0.96), ("interactive map", 0.89), . . . ]>

3.3.2 Selecting Noun Phrases Correlated with Permissions (e.g., Select Module 300)

Whether a certain noun phrase is related to a permission is learnt statistically from the dataset. If a permission perm and a noun phrase (np) appear together (e.g., perm in permission declarations and np in the description) in a high number of applications, it implies a close relationship between the two. This is however not trivial; some noun phrases (e.g., "game" and "application") may occur more frequently than others, biasing such calculations. Moreover, some noun phrases may be related to permissions but statistical techniques may not correlate them if they occur together in only a few cases in the dataset. The latter is partially resolved by leveraging the relatedness dictionary from the previous step. Based on existing data mining techniques, design a quality evaluation method that (a) is not biased to frequently occurring noun phrases, and (b) takes into account semantic relatedness between noun phrases to improve the statics of meaningful noun phrases that occurs less than often. For the permission (perm) and the noun phrase (np), the variables in the learning algorithm are determined as:

MP(perm, np): An application declares perm. Either np or any noun phrase with the semantic relatedness score to np above the threshold θg is found in the description. MP(perm, np) can increase by 1, if np is in the description, or it can increase by the maximal relatedness score of the noun phrase(s) related to n p.

MMP(perm, np): An application does not declare perm. Either np or any noun phrase with the semantic relatedness score to np above the threshold θg is found in the description. This variable can increase by 1, if np is in the description, or it can increase by the maximal relatedness score of the noun phrase(s) related to n p.

PR(perm, np): The ratio of MP(perm, np) to the sum of MP(perm, np) and MMP(perm, np):

$$PR(perm, np) = \frac{MP(perm, np)}{MP(perm, np) + MMP(perm, np)} \quad (1)$$

AVGPR(perm): The percentage of all the applications in the training set 306 that request perm.

INCPR(perm, np): This variable measures the increment of the probability that perm is requested with the presence of np or its related noun phrases given the unconditional probability as the baseline:

$$INCPR(perm, np) = \frac{PR(perm, np) - AVGPR(perm)}{AVGPR(perm)} \quad (2)$$

MMNP(perm, np): An applications declares perm. This variable can increase by 1, if none of np and noun phrases related to it in the Relatedness Dictionary are found in the description.

NPR(perm, np): The ratio of MP(perm, np) to the sum of MP(perm, np) and MMNP(perm, np):

$$NPR(perm, np) = \frac{MP(perm, np)}{MP(perm, np) + MMNP(perm, np)} \quad (3)$$

AVGNP(np): Expectation on the probability that one description contains np or related noun phrases over the training set 306. Assume the total number of applications is M. This variable is expressed as:

$$AVGNP(np) = \frac{\sum_{i=1}^{i=M} \lambda_i}{M}, \quad (4)$$

where $\lambda_i$ equals 1, if np is in the description of the i-th application. Or it equals to the maximal semantic relatedness score of its related noun phrase(s) found in description. If neither np nor noun phrases related to it in the Relatedness Dictionary are found, $\lambda_i=0$.

INCNP(perm, np): This variable measures the growth on the probability that one description includes np or the related noun phrases with the declaration of perm given expectation as the baseline:

$$INCNP(perm, np) = \frac{NPR(perm, np) - AVGNP(np)}{AVGNP(np)} \quad (5)$$

The calculations of variables MP(perm, np) and MMP(perm, np) take the semantic relatedness score as weight, which groups the related noun phrases and resolves the minor case issue. Note that INCPR(perm, np) and INCNP(perm, np) evaluate the quality of np by the growth of the probabilities that perm is declared and np (or noun phrases related to np) is detected in description with the average level as baseline. This design largely mitigates the negative effect caused by the intrinsic frequency of noun phrase. To roundly evaluate the quality of np of describing perm, determine the Q(perm, np), which is the harmonic mean of INCPR(perm, np) and INCNP(perm, np):

$$Q(perm, np) = \frac{2 \cdot INCPR(perm, np) \cdot INCNP(Perm, np)}{INCPR(perm, np) + INCNP(Perm, np)} \quad (6)$$

np with negative values of INCPR or INCNP is discarded as it shows no relevance to perm. Each permission has a list of noun phrases, arranged in descending order by the quality measured. The top-k noun phrases are selected for the permission. Set k=500 after checking the distribution of quality value for each permission. It is able to give a relatively complete semantic coverage of the permission. Increasing the threshold k excessively would enlarge the number of noun-phrase based governor-dependent pairs in the DPR model. So it would reduce the efficiency of the system and method in matching the semantic meaning for the incoming descriptions.

3.3.3 Pair np-Counterpart with Noun Phrase

By following the procedure presented in Section 3.3.2, the system and method can find a list of noun phrases closely related to each permission. However, simply matching the permission with noun phrase alone fails to explore the context and semantic dependencies, which increases false positives. The example sentence below tells the reason for needing the permission to retrieve running applications. Although a noun phrase related to "map" is detected, this sentence does not reveal any location permission.

"Retrieve Running Apps" permission is required because, if the user is not looking at the widget actively (for e.g. he might using another app like Google Maps)"

To resolve this problem, the system and method can leverage Stanford Parser 104 to get the knowledge of context and typed dependencies. For each selected noun phrase np, denote as G(np) the set of noun phrases that have semantic relatedness scores with np higher than θg. Given a sentence in description, identify any noun phrase np'∈G(np) and records each np-counterpart (nc) (e.g., np-counterpart was determined as a collective term for verb phrases, noun phrases, and possessives for the target noun phrase), which has direct/indirect relation with np'. For each noun-phrase based governor-dependent pair <nc, np>, let the total number of descriptions where the pair <nc, np'> is detected be SP.

In the SP applications, let the number of application requesting the permission is tc. Keep only those pairs for which (1) tc/SP>PreT, (2) SP>FreT, where PreT and FreT are configurable thresholds. The precision and the number of samples can be large enough to yield statistical results with confidence.

3.4 Decision

From DPR model, each permission has a list of related pairs of np-counterpart ncdpr and noun phrase npdpr, which reveal the security features of the permission. For an input application whose description has to be checked, the NLP module 100 extracts the pairs of np-counterpart ncnew and noun phrase npnew in each sentence. Leverage the DS model to measure the semantic relatedness score RelScore (txtA, txtB) between the two texts txtA and txtB. If <ncnew, npnew> is matched with a pair <ncdpr, npdpr> by fulfilling the conduction below, the sentence is identified as revealing the permission.

$$\text{RelScore}(ncnew, ncdpr) > \gamma \quad (7)$$

$$\text{RelScore}(npnew, npdpr) > \Theta \quad (8)$$

Here, γ and Θ are the thresholds of the semantic relatedness score for np-counterparts and noun phrases.

Implementation

NLP module 100: Application descriptions in HTML format are first converted to plain text. The NLTK library in Python and regular expression matching can be used to implement the SBD. NLTK is also used for removing stop-words and normalizing words using lemmatization based on WordNet. Stanford Named Entity Recognizer is used for removing named entities. Stanford Parser 104's hierarchical output is obtained in XML format; the output is parsed using standard libraries in Python.

DS and DPR Models: Noun phrases are classified by frequency (the number of descriptions which contain the noun phrase). The high-frequency noun phrases are grouped based on semantic relatedness score by leveraging the library ESAlib. This library is a currently maintained, open-source implementation of ESA 108. The training algorithm on descriptions and permissions of large-scale applications selects the semantic patterns, which strongly correlate with the target permission by leveraging the frequency-based measurement and ESA 108. An implementation pairs np-counterpart of length one (noun, verb, and possessive) with noun phrases. The np-counterpart could be easily extended to multiple words, possibly with a few considerations about maximum phrase length, and so on. Decision: To measure the description-to-permission fidelity of an application, the pairs of np-counterpart and noun phrase extracted from description are matched with the semantic patterns in DPR model by using ESA 108. The sentences indicating permissions can be annotated. The system and method can find all the questionable permissions, which are not warranted in description.

Evaluation

5.1 Permission Selection and Dataset

Infer 36 mobile platform permissions from the risks with highest user concerns. Since the focus is on third-party applications, first remove from this list the Signature/System permissions, which are granted only to applications that are signed with the device manufacturer's certificate. Seven permissions were removed as a result. The 29 remaining permissions are arranged in descending order by the percentage of applications requesting it in the dataset, which is collected randomly. Select the top 14 permissions; the consequent human efforts make it difficult to review large number of descriptions.

Collected the declared permissions and descriptions of 61,268 mobile applications from Google Play in August 2013. The dataset includes the top and newly posted applications from all twenty-six categories of applications of applications, e.g., Business. Among the 61,268 applications, some of them do not request any of the sensitive permissions identified above or their descriptions are not written in English. Remove these applications and the size of the dataset is 37,845.

The permissions that constitute the subject of the study can be divided into 3 categories according to the abilities that they entail: (1) accessing user privacy, (2) costing money, and (3) other sensitive permissions. Applications request the permissions to access privacy may leak users' personal information such as location to third parties without their awareness. Permissions in the costing money category include CALL PHONE and may be exploited resulting in financial loss to the users. Other sensitive permissions may change settings, start applications at reboot, thus possibly wasting phone's battery, and so on. In Table 2, list the number and percentage of applications declaring each permission in the dataset.

TABLE 2

Permission used in evaluation

| Permission | #App (Percentage %) |
|---|---|
| WRITE EXTERNAL STORAGE | 30384 (80.29%) |
| ACCESS FINE LOCATION | 16239 (42.91%) |
| ACCESS COARSE LOCATION | 15987 (42.24%) |
| GET ACCOUNTS | 12271 (32.42%) |
| RECEIVE BOOT COMPLETED | 9912 (26.19%) |
| CAMERA | 6537 (17.27%) |
| GET TASKS | 6214 (16.42%) |
| READ CONTACTS | 5185 (13.70%) |
| RECORD AUDIO | 4202 (11.10%) |
| CALL PHONE | 3130 (8.27%) |
| WRITE SETTINGS | 3056 (8.07%) |
| READ CALL LOG | 2870 (7.58%) |

TABLE 2-continued

Permission used in evaluation

| Permission | #App (Percentage %) |
|---|---|
| WRITE CONTACTS | 2176 (5.74%) |
| READ CALENDAR | 817 (2.16%) |

5.2 Accuracy Evaluation

5.2.1 Methodology

In training DPR model, the two thresholds PreT (the probability that a pair of np-counterpart and noun phrase matches the permission) and FreT (the number of samples) balance the performance on precision and coverage of DPR model. For each sensitive permission, an adaptive mechanism can be used to find the near-optimal thresholds PreT and FreT. A small set of application descriptions and permissions (other than the validation set) are labeled as either reasoning the usage of permission or not. Then various thresholds can be used to train the DPR model and evaluate how well the DPR model with each different thresholds align with human decision. The pair of thresholds with best accuracy can be selected. The settings depend on the number/percentage of applications requesting the target permission in the training set 306. For a permission with fewer positive samples (application requires that permission), each pair of np-counterpart and noun phrase related to it tends to be less dominant in amount, adjust FreT accordingly to maintain the performance on recall. Keep PreT high across permissions, which mainly aims at enhancing the precision of detection.

For each application in validation set, parse noun-phrase based governor-dependent pairs from sentences in descriptions, which are matched with each pair of Np-counterpart and Noun Phrase in DPR model. Set the two thresholds $\gamma=0.8$ and $\Theta=0.67$. Empirically find the best values for these thresholds. It is straightforward to understand that low threshold reduces the performance on precision and increasing the threshold excessively causes the increment on false negatives. Set up the threshold $\Theta$ lower than $\gamma$, because noun phrases has more diversity in patterns than np-counterparts; phrases containing various numbers of words organized in different order may express the similar meaning.

The statistics and setting of the evaluation are listed on Table 3. Column "FreT" and column "PreT" are the settings of the two thresholds for each permission. Furthermore, column "Gd" is the percentage of "good" descriptions. The percentage values of "good" descriptions for the three permissions GET TASKS, CALL PHONE, and READ CALL LOG are lower than 10%. Call these permissions rarely described well in descriptions, hidden permissions. The scarcity of qualified descriptions leads to the lack of correlated semantic patterns. It would hinder the measurement of description-to-permission fidelity. After removing the three hidden permissions, the evaluation focuses on the other 11 permissions.

TABLE 3

Statistics and settings for evaluation

| Permission | FreT | PreT | Gd (%) |
|---|---|---|---|
| WRITE EXTERNAL STORAGE | 9 | 0.87 | 38.7 |
| ACCESS FINE LOCATION | 6 | 0.85 | 40.7 |
| ACCESS COARSE LOCATION | 5 | 0.8 | 35.3 |
| GET ACCOUNTS | 4 | 0.8 | 26.0 |
| RECEIVE BOOT COMPLETED | 5 | 0.85 | 37.3 |
| CAMERA | 3 | 0.8 | 48.7 |
| GET TASKS | 3 | 0.9 | 2.0 |
| READ CONTACTS* | 3 | 0.8 | 56.8 |
| RECORD AUDIO* | 3 | 0.8 | 64.0 |
| CALL PHONE | 2 | 0.8 | 10.0 |
| WRITE SETTINGS | 2 | 0.85 | 44.7 |
| READ CALL LOG | 3 | 0.95 | 6.0 |
| WRITE CONTACTS | 2 | 0.9 | 42.0 |
| READ CALENDAR* | 1 | 0.85 | 43.6 |

An objective is to evaluate how closely the decision made by the system and method on the declaration of permission approaches human recognition given a description. The evaluation presents description-level permission inferences rather than sentence-level ones because a human would infer the permission based on the logic relation among sentences in the whole description. The number of true positives, false positives, false negatives, and true negatives are denoted as T P, F P, F N, and T N.

T P: the system correctly identifies a description as revealing the permission.

F P: the system incorrectly identifies a description as revealing the permission.

F N: the system incorrectly identifies a description as NOT revealing the permission.

T N: the system correctly identifies a description as NOT revealing the permission.

Figure 4:
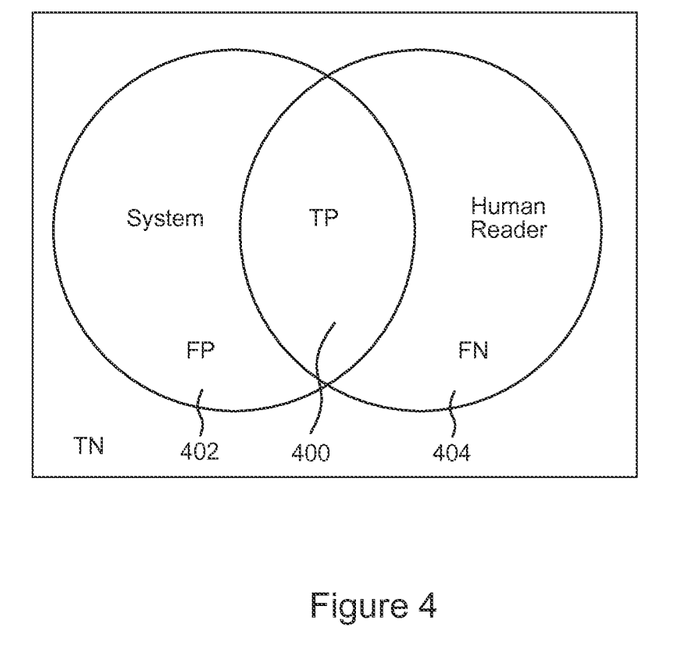
FIG. 4 is an exemplary interpretation of metrics in evaluation.

Interpretation of the metrics is shown in FIG. 4. Intersection 400 of decisions made by the system 402 and human reader 404 is true positive. Difference sets between decisions made by the system 402 and human reader 404 are false positive and false negative. Complementary set of the union of the system 402 decisions and human reader 404 is true negative. Values of precision, recall, F-score, and accuracy represent the degree to which the system and method matches human recognition in inferring permission by description.

$$\text{Precision} = \frac{TP}{TP + FP} \quad (9)$$

$$\text{Recall} = \frac{TP}{TP + FN} \quad$$

$$F\text{-score} = \frac{2 \cdot \text{Precision} \cdot \text{Recall}}{\text{Precision} + \text{Recall}} \quad (10)$$

$$\text{Accuracy} = \frac{TP + TN}{TP + FP + TN + FN} \quad (11)$$

5.2.2 Results

Results of exemplary evaluation are given in Table 4. The system 402 matches human readers 404 in inferring 11 permissions with the average precision, recall, F-score, and accuracy as 92.6%, 92.0%, 92.3%, and 93.2%. As discussed before, WHYPER's methodology can fail to get results for permission RECEIVE BOOT COMPLETED. For the remaining 10 permissions, WHYPER achieves the average precision, recall, F-score, and accuracy as 85.5%, 66.5%, 74.8%, and 79.9%.

TABLE 4

Results of exemplary evaluation

| System | Permission | T P | F P | F N | T N | Prec (%) | Rec (%) | F (%) | Accu |
|---|---|---|---|---|---|---|---|---|---|
| System | WRITE EXTERNAL | 53 | 6 | 5 | 86 | 89.8 | 91.4 | 90.6 | 92.7 |
| | ACCESS FINE | 57 | 3 | 4 | 86 | 95.0 | 93.4 | 94.2 | 95.3 |
| | ACCESS COARSE | 49 | 1 | 4 | 96 | 98.0 | 92.5 | 95.1 | 96.7 |
| | GET ACCOUNTS | 34 | 4 | 5 | 107 | 89.5 | 87.2 | 88.3 | 94.0 |
| | RECEIVE BOOT | 51 | 6 | 5 | 88 | 89.5 | 91.1 | 90.3 | 92.7 |
| | CAMERA | 67 | 7 | 6 | 70 | 90.5 | 91.8 | 91.2 | 91.3 |
| | READ CONTACTS | 99 | 5 | 9 | 77 | 95.2 | 91.7 | 93.4 | 92.6 |
| | RECORD AUDIO | 117 | 10 | 11 | 62 | 92.1 | 91.4 | 91.8 | 89.5 |
| | WRITE SETTINGS | 65 | 7 | 2 | 76 | 90.3 | 97.0 | 93.5 | 94.0 |
| | WRITE CONTACTS | 57 | 4 | 6 | 83 | 93.4 | 90.5 | 91.9 | 93.3 |
| | READ CALENDAR | 79 | 5 | 6 | 105 | 94.0 | 92.9 | 93.5 | 94.4 |
| | Total | 728 | 58 | 63 | 936 | 92.6 | 92.0 | 92.3 | 93.2 |
| WHYPER | WRITE EXTERNAL | 11 | 8 | 47 | 84 | 57.9 | 19.0 | 28.6 | 63.3 |
| | ACCESS FINE | 31 | 1 | 30 | 88 | 96.9 | 50.8 | 66.7 | 79.3 |
| | ACCESS COARSE | 28 | 1 | 25 | 96 | 96.6 | 52.8 | 68.3 | 82.7 |
| | GET ACCOUNTS | 9 | 2 | 30 | 109 | 81.8 | 23.1 | 36.0 | 78.7 |
| | RECEIVE BOOT | | | | | Fail to get results | | | |
| | CAMERA | 26 | 4 | 47 | 73 | 86.7 | 35.6 | 50.5 | 66.0 |
| | READ CONTACTS | 89 | 9 | 19 | 73 | 90.8 | 82.4 | 86.4 | 85.3 |
| | RECORD AUDIO | 105 | 10 | 23 | 62 | 91.3 | 82.0 | 86.4 | 83.5 |
| | WRITE SETTINGS | 59 | 24 | 8 | 59 | 71.1 | 88.1 | 78.7 | 78.7 |
| | WRITE CONTACTS | 53 | 9 | 10 | 78 | 85.5 | 84.1 | 84.8 | 87.3 |
| | READ CALENDAR | 78 | 15 | 7 | 95 | 83.9 | 91.8 | 87.6 | 88.7 |
| | Total | 489 | 83 | 246 | 817 | 85.5 | 66.5 | 74.8 | 79.9 |

Across the permissions evaluated, the least precision and recall of the system and method are 89.5% and 87.2%. Even for the permission to get user's account information with low percentage of "good" descriptions and the permission to read calendar with low number of positive samples, the system and method could still get the DPR model aligning with user's recognition well, which is attributed to the learning-based algorithm and leveraging ESA 108. WHYPER may only infer 5 permissions from description (last 5 in Table 4) with both the values of precision and recall higher than 70%. For these permissions, the API documents provide a relatively complete and accurate semantic pattern set. The example patterns such as <"scan","wifi">, <"enable","bluetooth">, and <"set","sound"> could be extracted from the API document of the permission WRITE SETTINGS. However, WHYPER does not perform well on the other 5 permissions. The understanding is that the patterns extracted from API documents in these cases are very limited to cover the natural-language descriptions with great diversity. For example, the APIs mapped with permission WRITE EXTERNAL STORAGE are related only to download management. A lot of intuitive patterns, such as <"save", "sd card">, <"transfer", "file">, <"store", "photo"> cannot be found in its API document. It is also the same with <"scan", "barcode">, <"record", "video"> for camera permission, <"find", "branch">, <"locate", "gas station"> for location permissions, and <"integrate", "facebook"> (in-app login) for permission GET ACCOUNTS. Given WHYPER's big variance of performance and the investigation on its source of textual pattern set, find that suitability of API document to generate a complete and accurate set of patterns varies with permissions due to the limited semantic information in APIs. The system and method can rely on large number of descriptions in training, which would not be restricted by the limited semantic information issue and has stronger ability of generalization over permissions.

Whether or not the API documents are suitable for the evaluated permissions, note that the system and method can outperform WHYPER on both precision and recall.

An advantage of the system and method over WHYPER on false negative rate (or recall) can be caused by: (1) the difference in the fundamental method to find semantic patterns related to permissions (2) include the logical dependency between noun phrases as extra ontology. WHYPER is limited by the use of a fixed and limited set of vocabularies derived from the mobile API documents and their synonyms. The correlation of permission with noun-phrase based governor-dependent pair is based on clustering results from a large application dataset, which is much richer than that extracted from API documents. Below are three example sentences:

"Filter by contact, in/out SMS"

"Blow into the mic to extinguish the flame like a real candle"

"5 calendar views (day, week, month, year, list)"

The first sentence describes the function of backing up SMS by selected contact. The second sentence reveals a semantic action of blowing into the microphone. The last sentence introduces one calendar application, which provides various views. In the DPR model, the noun-phrase based governor-dependent pairs <filter, contact>, <blow, mic>, and <view, calendar> are found to be correlated to the 3 permissions, READ CONTACTS, RECORD AUDIO, and READ CALENDAR. While the semantic information for the first two sentences cannot be found by leveraging the API documents. For the last one, WHYPER could only detect it, as "view" and "calendar" are tagged with verb and noun, respectively. (Both of them are tagged as noun here).

One reason for this difference in detection is that WHYPER is not able to accurately explore the meaning of noun phrase with multiple words. Below is one example sentence:

"Saving event attendance status now works on mobile 4.0"

The sentence tells nothing about requiring the permission to access calendar. However, WHYPER incorrectly labels it as revealing the permission READ CALENDAR, because it parses resource name "event" and maps it with action "save". The system and method is able to differentiate the two phrases "event attendance status" and "event" by using ESA 108 and effectively filters the interference in DPR model training and decision-making.

This difference is caused by the fact that some semantic patterns implying permissions are not included in the DPR model. Below is one example sentence:

"Ability to navigate to a Contact if that Contact has address information"

WHYPER detects the word "contact" as resource name and maps it with the verb "navigate". Thus, this sentence is identified as revealing the permission to read the address book. However, no noun-phrase based governor-dependent pair in the DPR model could be mapped to the permission sentence above, because the pair <navigate, contact> is not dominant during the training process. The DPR model might not be knowledgeable enough to completely cover the semantic patterns correlated with the permission. However, the semantic coverage could be enhanced as the size of training set 306 increases.

In the training process, some semantic patterns, which do not directly describe the reason for requesting the permission in the perspective of user expectation, are selected in the frequency-based measurement. One example sentence is given as:

"Mumble is a VoIP based communication system very similar to Ventrilo and Team Speak"

The sentence describes the functionality of Voice over Internet Protocol (VoIP), which allows user to make a call over internet. It is recognized as describing the permission to record audio by the system and method. The model assigns a high relatedness score between "voip" and RECORD AUDIO due to quite a few training samples with related keywords and this permission together. Such cases are due to the fundamental gap between machine learning and human cognition.

The system and method can leverage Stanford Parser 104 to get the tagged words and hierarchal dependency tree. A cause of the common erroneous detection of two systems (FP, FN) is the incorrect parsing of sentence by underlying NLP infrastructure. As the research in the field of NLP advances underlying NLP infrastructure, the number of such errors can be reduced.

The following are some representative semantic patterns, which are found to be closely correlated by the DPR model to the permissions evaluated.

WRITE EXTERNAL STORAGE: <write,external storage>, <save, photo>, <delete, audio file>, <download, funny ringtone>, <convert, file format>

ACCESS FINE LOCATION: <display, map>, <search, location>, <find, branch atm>, <push, local weather>, <your, location>

ACCESS COARSE LOCATION: <set, gps navigation>, <remember, current location>, <inform, local traffic>, <provide, map view>

GET ACCOUNTS: <manage, account>, <integrate, facebook>, <support, single sign-on>

RECEIVE BOOT COMPLETED: <change, hd wallpaper>, <display, notification bar>, <optimize, battery>, <allow, news alert>

CAMERA: <configure, phone camera>, <deposit, check>, <scanner, barcode>, <snap, photo>

READ CONTACTS: <block, text message>, <beat, facebook friend>, <backup, contact>, <expand, social networking>, <send, private message>

RECORD AUDIO: <send, voice message>, <record, video>, <note, voice>, <blow, microphone>

WRITE SETTINGS: <set, ringtone>, <refresh, network connection>, <customize, alarm sound>, <enable, flight mode>

WRITE CONTACTS: <wipe, contact list>, <synchronize, address book>, <secure, text message>, <merge, specific contact>

READ CALENDAR: <track, event>, <optimize, time>, <schedule, appointment>, <synchronize, calendar>

5.3 Runtime Latency

Randomly select five hundred applications requiring each permission and assess the runtime latency of the system in measuring the description-to-permission fidelity. Here, the DS model (ESA 108), grammatical structure analysis (Stanford Parser 104), and DPR model are preloaded.

The results are given in Table 5. The column "Latency" is the average runtime latency for the system to correlate the description of one application to target permission, where hidden permissions are excluded. The system and method achieves the latency less than 4.5 s for all the 11 permissions. The major portion of time consumption is to match the semantic information extracted from description to each semantic pattern related to permission. Thus, the runtime latency increases with the number of correlated semantic patterns selected in the training process. On one hand, the learning-based approach makes sure that only the closely correlated semantic patterns with high confidence in statistics are selected, which avoids excessively increasing the number of noun-phrase based governor-dependent pairs in DPR model, effectively controls the latency, and resolves the scalability issue. On the other hand, the DS model expands the coverage of DPR model and the recall of the system and method can be slightly affected.

TABLE 5

Results of runtime latency

| Permission | Latency (ms) |
| --- | --- |
| WRITE EXTERNAL STORAGE | 4289 |
| ACCESS FINE LOCATION | 4318 |
| ACCESS COARSE LOCATION | 659 |
| GET ACCOUNTS | 2573 |
| RECEIVE BOOT COMPLETED | 1951 |
| CAMERA | 457 |
| READ CONTACTS | 1179 |
| RECORD AUDIO | 551 |
| WRITE SETTINGS | 604 |
| WRITE CONTACTS | 123 |
| READ CALENDAR | 338 |

The system and method measures the description-to-permission fidelity by finding relationships between textual patterns in the descriptions and the permissions. Because of the techniques used and the new modeling techniques developed, the system and method achieves good accuracy.

The models learnt in the system and method are examples of unsupervised learning, which has the drawback of picking relationships that may not actually exist directly. If a noun phrase appears frequently with a permission, the DPR model can learn that they are actually related. For example, if many antivirus applications use the GET TASKS permission, the "antivirus" noun may become associated with this permission even if there is no direct relationship between the two.

From another perspective though, one could argue that this is even better because the system 402 may be able to extract implicit relationships that human readers 404 may easily miss. Anecdotally, for applications with the GET TASKS permission in the experiments, even if human readers 404 could find only 2% applications whose descriptions reveal that permission, the system and method could find 18% such applications.

As for the implementation of the system and method, the accuracy may be improved by including longer noun phrases and np-counterparts. It is primarily an efficiency-accuracy tradeoff. The evaluation of the system and method also had some limitations. Manual reading is subjective and the results may be biased. However, given that the readers have a technical background, they may be able to discover many implicit relationships that average users ignore, thus putting up greater challenges for the system and method. Whether a description implies a permission can itself be subjective.

Malicious developers may provide wrong descriptions to evade this approach. Yet given that most developers are not malicious and for the majority of times there may only be a communication gap between developers and users, the system and method can help bridge this gap.

Applications

Application developers can use the systems and methods 1 to receive an early, automatic feedback on the equality of description so that they improve the descriptions to better reflect the security-related aspects of the applications.

End users may use the systems and methods to understand if an application is over-privileged and risky to use.

Application markets can deploy the systems and methods to bolster their overall trustworthiness.

Advantages

The system and methods can rely on descriptions and permissions of large-scale applications to train the description-to-permission relatedness (DPR) model 110, which correlates semantic pattern with permission. Other methods can rely on external source, such as mobile API, which can come across the issues of availability and lack of semantic information.

The systems and methods can be accurate with few false positives or false negatives.

The systems and methods can include a low runtime overhead.

The processes to train the DPR model and identify whether description reveals the declaration of permission can be automatic. In other systems, no policy is determined on how to select correlated semantic patterns from external source, which can hinder automating the procedure in a systematic way.

A mobile device can access a user-friendly web portal to check the description-to-permission fidelity of the target application.

Exemplary Deployment

The system and method front-end application can run as a background service on a phone, to automatically capture the installation of an application, and push the related security, privacy, and permissions information to a display of the phone, e.g., for consideration by a phone user.

The system and method backend server can maintain an up-to-date data set of permissions/descriptions from the app market together with the processed results to quickly respond to user queries for information about apps.

The system and method can provide users with an interface to give feedback, where users select the sentence and the permission revealed to the perspective of themselves. The server collects the feedback, e.g., and processes the feedback to optimize the description-to-permissions relatedness (DPR) model 110, which can allow the system and method to align better with a user in inferring permissions from description.

The systems and methods described above may be implemented in many different ways in many different combinations of hardware, software, firmware, or any combination thereof. In one example, the systems and methods can be implemented with a processor and a memory, where the memory stores instructions, which when executed by the processor, causes the processor to perform the systems and methods. The processor may mean any type of circuit such as, but not limited to, a microprocessor, a microcontroller, a graphics processor, a digital signal processor, or another processor. The processor may also be implemented with discrete logic or components, or a combination of other types of analog or digital circuitry, combined on a single integrated circuit or distributed among multiple integrated circuits. All or part of the logic described above may be implemented as instructions for execution by the processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. A product, such as a computer program product, may include a storage medium and computer readable instructions stored on the medium, which when executed in an endpoint, computer system, or other device, cause the device to perform operations according to any of the description above. The memory can be implemented with one or more hard drives, and/or one or more drives that handle removable media, such as diskettes, compact disks (CDs), digital video disks (DVDs), flash memory keys, and other removable media.

The systems and methods can also include a display device, an audio output and a controller, such as a keyboard, mouse, trackball, game controller, microphone, voice-recognition device, or any other device that inputs information. The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. The systems and methods can be implemented over a cloud.

While various embodiments have been described, it can be apparent that many more embodiments and implementations are possible. Accordingly, the embodiments are not to be restricted.

The invention claimed is:

1. A method, comprising:
   parsing application descriptions for mobile applications to determine semantic hierarchies for the application description, and assigning tags to words of the parsed application descriptions;

machine learning semantic patterns by correlating the parsed and tagged application descriptions to application permissions, and storing the semantic patterns in a database, where the machine learning analyzes descriptions and permission of a dataset of applications to measure how closely noun phrases relate to permissions, where a natural language processing module provides noun phrases and noun phrase counterparts, where an explicit semantic analysis module groups noun phrases with similar semantics, where, for each permission, a select module produces a list of noun phrases from the grouped noun phrases whose occurrence in description is positively related to a declaration of the permission, where the noun phrase counterparts are paired with the noun phrases and only the pairs whose occurrence statistically correlate with the declaration of the permission are kept;

extracting, with a processor, description information of an application from an application marketplace for a mobile application;

receiving, with the processor, permission information of an application from the application marketplace for the mobile application;

querying the database of stored semantic patterns against the description information;

comparing, with the processor, the extracted description information and the stored semantic patterns to the received permission information to determine if at least one of the description information and the stored semantic patterns reflect the permission information; and automatically displaying, with the processor, an alert on a device, if the mobile application requests more permissions than required for stated functionalities based on the comparison.

2. The method of claim 1, where the description information reflects the permission information if the description information relates to the permission information.

3. The method of claim 1, where the semantic patterns are determined based on frequency-based measurements.

4. The method of claim 1, further comprising comparing description semantics to the description information and the permission information to determine if the description information reflects the permission information.

5. A method, comprising:
parsing application descriptions for mobile applications to determine semantic hierarchies for the application description, and assigning tags to words of the parsed application descriptions;

machine learning semantic patterns by correlating the parsed and tagged application descriptions to application permissions, and storing the semantic patterns in a database, where the machine learning analyzes descriptions and permission of a dataset of applications to measure how closely noun phrases relate to permissions, where a natural language processing module provides noun phrases and noun phrase counterparts, where an explicit semantic analysis module groups noun phrases with similar semantics, where, for each permission, a select module produces a list of noun phrases from the grouped noun phrases whose occurrence in description is positively related to a declaration of the permission, where the noun phrase counterparts are paired with the noun phrases and only the pairs whose occurrence statistically correlate with the declaration of the permission are kept;

querying the database of stored semantic patterns against a description from an application marketplace for a mobile application;

comparing, with the processor, a permission of the mobile application with a noun phrase of the description of the mobile application and with the stored semantic patterns;

determining, with the processor, a relatedness of the permission and the description based on the comparing; and automatically displaying, with the processor, an alert, on a device, if the mobile application requests more permissions than required for stated functionalities.

6. The method of claim 5, further comprising considering a frequency of occurrence of the noun phrase in the determining.

7. The method of claim 5, further comprising displaying the determined relatedness to a device of the mobile application.

8. The method of claim 7, further comprising displaying a questionable permission if the permission is determined not related to the description.

\* \* \* \* \*